United States Patent [19]

Whitmore

[11] Patent Number: 5,018,722
[45] Date of Patent: May 28, 1991

[54] EXERCISE TREADMILL BELT

[76] Inventor: Henry B. Whitmore, Rte. 5, Box 369, San Antonio, Tex. 78221

[21] Appl. No.: 272,816

[22] Filed: Nov. 18, 1988

Related U.S. Application Data

[63] Continuation-in-part of Ser. No. 61,331, Jun. 11, 1987, abandoned.

[51] Int. Cl.$^5$ ............................................. A63B 22/02
[52] U.S. Cl. ................................................... 272/69
[58] Field of Search .................. 272/69; 198/321, 326, 198/327, 333, 690.2, 699.1, 750, 775, 776, 818, 819, 821, 822, 844, 846, 849, 850–853; 474/201–203, 205, 207, 212, 213, 240–242, 249–251

[56] References Cited

U.S. PATENT DOCUMENTS

| | | | |
|---|---|---|---|
| 1,040,411 | 10/1912 | Raymond | 198/321 X |
| 1,211,765 | 1/1917 | Schmidt | 272/69 |
| 1,215,196 | 2/1917 | Richardson | 474/240 |
| 1,846,431 | 2/1932 | Mitchell | 198/822 X |
| 2,017,885 | 10/1935 | Atcheson | 272/69 |
| 2,514,429 | 7/1950 | Waugh . | |
| 2,784,835 | 3/1957 | Dixon | 198/690.2 |
| 2,928,523 | 3/1960 | Neidhardt | 198/822 X |
| 3,237,757 | 3/1966 | Perkins | 198/690.2 |
| 3,626,775 | 12/1971 | Gentry . | |
| 3,656,360 | 4/1972 | Fix | 474/249 X |
| 3,689,066 | 9/1972 | Hagen | 198/844 X |
| 3,750,863 | 8/1973 | Pyczynski | 198/321 |
| 3,783,990 | 1/1974 | Siciliano | 198/690.2 X |
| 3,964,596 | 6/1976 | Heusler et al. . | |
| 3,995,507 | 12/1976 | White et al. . | |
| 4,034,615 | 7/1977 | Brooks . | |
| 4,227,487 | 10/1980 | Davis | 272/69 X |
| 4,509,510 | 4/1985 | Hook | 272/69 X |
| 4,565,276 | 1/1986 | Dengs et al. | 198/321 |
| 4,614,337 | 9/1986 | Schönenberger | 272/69 |

Primary Examiner—Richard J. Apley
Assistant Examiner—David F. Crosby

[57] ABSTRACT

The invention provides a uni-flex belt which can bend only in one direction and which has particular utility in treadmills. The uni-flex belt of the invention comprises a continuous loop having an outer portion and a non-stretchable inner portion attached to one another. The outer portion comprises a multiplicity of abutting transverse rigid tread segments which extend across the belt and which have sides substantially parallel to one another. The tread segments press together and are laterally compacted during operation of the belt to provide a substantially smooth outer surface and to cooperate with the inner portion to prevent the belt from sagging or bending in the other direction.

9 Claims, 4 Drawing Sheets

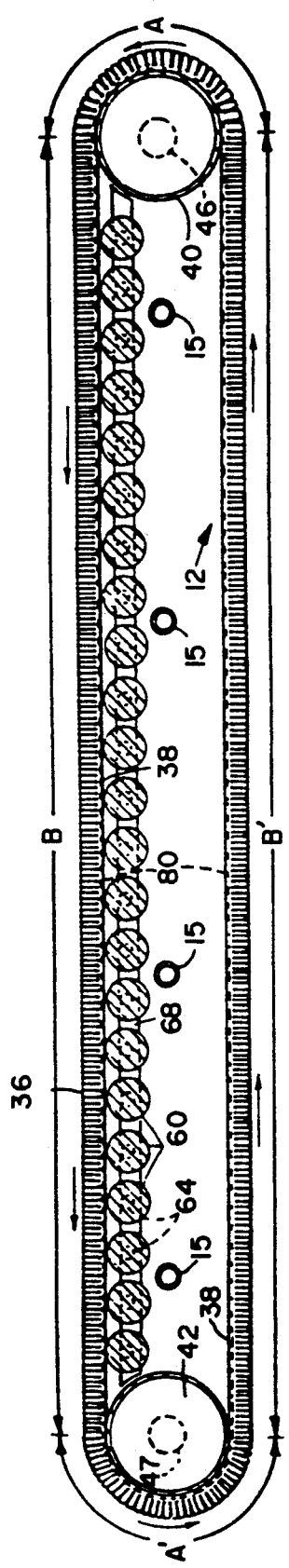
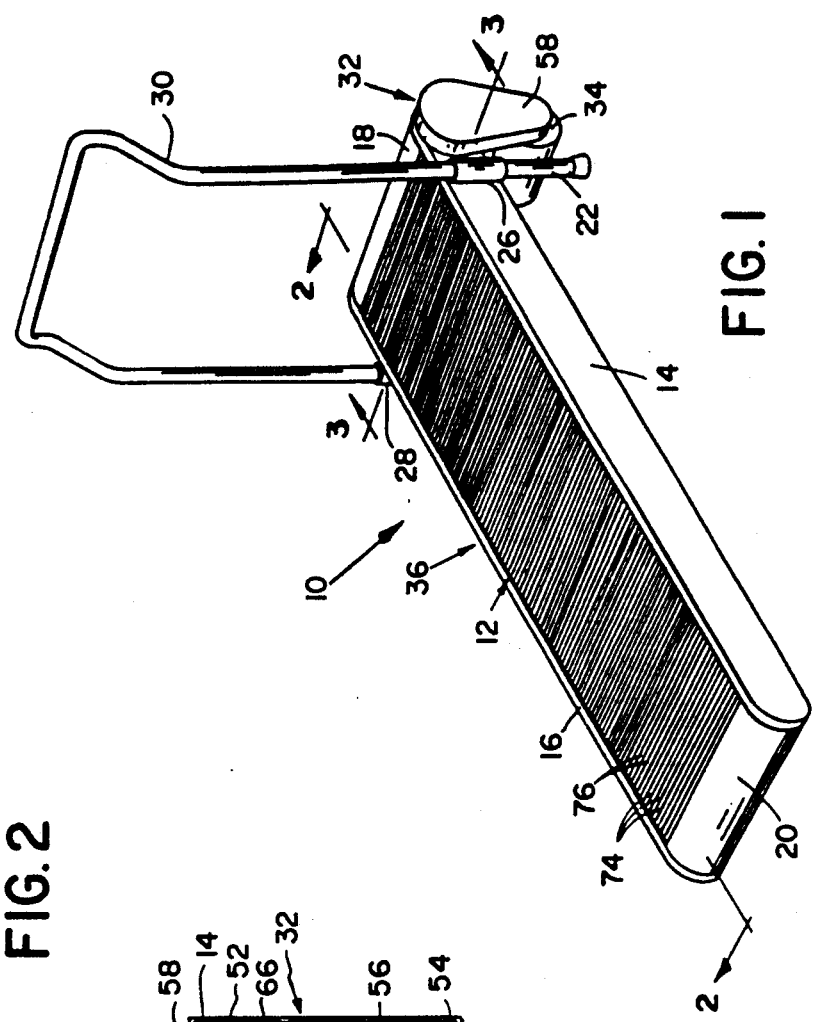
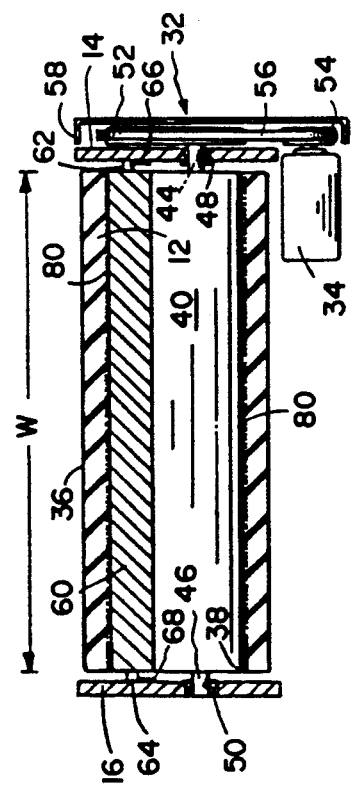

EXERCISE TREADMILL BELT

This application is a continuation-in-part of Copending application Ser. No. 61,331 filed June 11, 1987 for Exercise Treadmill Belt in the name of Henry B. Whitmore, which has now been abandoned.

BACKGROUND OF THE INVENTION

Exercise treadmills typically provide a walking or running surface which moves beneath the feet of the person utilizing the treadmill. The treadmill may be an active system wherein a motor drives the belt or a passive system wherein the user's feet drive the belt. The walking or running surface may comprise a thin, continuous loop belt which is stretched about a drive pulley on one end of the treadmill, an idler pulley on the opposite end of the treadmill and a plurality of rollers intermediate the drive pulley and idler pulley. In this type of thin belt treadmill, the rollers can generally be felt by the user's feet, thereby creating an unnatural and uncomfortable sensation. Further, a large amount of friction and drag is caused by the downward pressure of the user's feet on the belt and rollers and the tendency of the thin belt to dip or sag between the rollers. The use of a skid pad or plate in place of the rollers also results in a large amount of friction and drag caused by the downward pressure of the user's feet on the belt and skid plate and the resulting drag of the thin belt against the plate As a result of such friction, prior passive system treadmills are generally difficult to drive and prior active system treadmills generally require a motor having a horse-power (hp) in the range of approximately 4 hp–10 hp.

SUMMARY OF THE INVENTION

The invention provides a uni-flex belt which can bend in one direction only, and which has particular utility in treadmills. The belt comprises a continuous loop having an outer portion and a substantially non-stretchable inner portion which are attached to one another, and which may be supported on appropriate rollers under each side. The outer portion comprises a multiplicity of abutting transverse rigid tread segments which extend across the belt and which have sides substantially parallel to one another. The tread segments press together and are laterally compacted during operation of the belt to provide a substantially smooth outer surface and to cooperate with the inner portion to prevent the belt from sagging between the rollers. This allows the belt to run quietly and with low friction. Specifically, when weight is applied to the outer surface of the belt the segments compress together giving strength to the belt and providing a solid floor feeling to the user.

BRIEF DESCRIPTION OF THE DRAWINGS

FIG. 1 is a perspective view of an exercise treadmill incorporating the preferred embodiment of the treadmill belt of the present invention.

FIG. 2 is a cross-sectional view of the exercise treadmill taken along section lines 2—2 of FIG. 1 further illustrating the preferred embodiment of the treadmill belt of the present invention.

FIG. 3 is a cross-sectional view of the exercise treadmill taken along section lines 3—3 of FIG. 1 further illustrating the preferred embodiment of the treadmill belt of the present invention.

DETAILED DESCRIPTION OF THE PREFERRED EMBODIMENT

Figure 4:
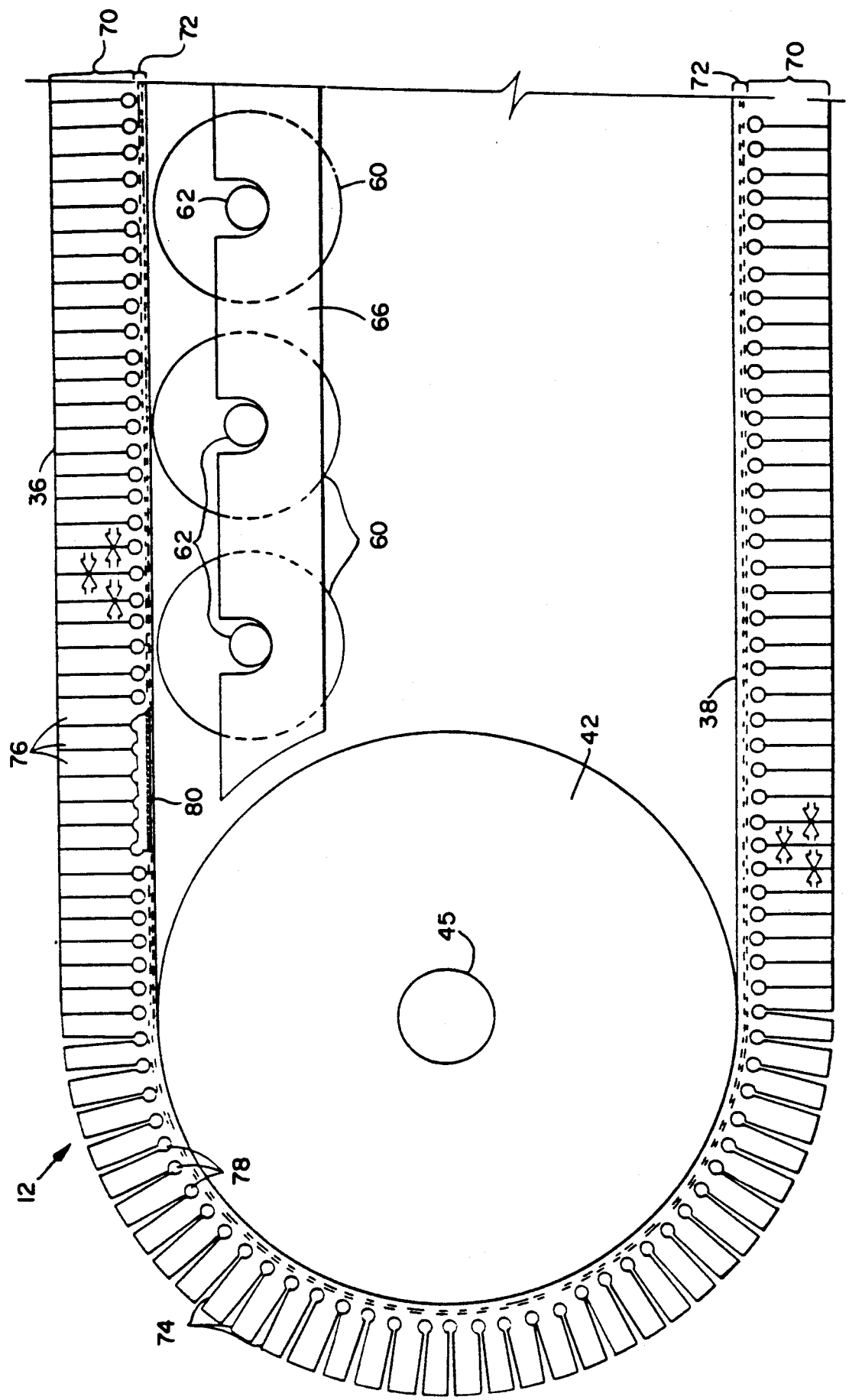
FIG. 4 is a partial side view of the exercise treadmill illustrated in FIG. 1 further illustrating the preferred embodiment of the treadmill belt of the present invention.

Referring to FIG. 1, an exercise treadmill incorporating the treadmill belt of the present invention is identified by the number 10. The exercise treadmill belt of the present invention is identified by the number 12. For purposes of clarity, the belt 12 is illustrated as being fitted on a treadmill body. In addition to the belt 12, the exercise treadmill 10 comprises a right side panel 14 and a left side panel 16. The exercise treadmill 10 further comprises a forward end cover 18, which is appropriately connected to side panels 14 and 16, and a rearward end cover 20, which is also appropriately connected to side panels 14 and 16. Forward end cover 18 is preferably received within grooves within the forward ends of the side panels 14 and 16 and secured to panels 14 and 16 by screws. Rearward end cover 20 is preferably received within grooves within the rearward ends of side panels 14 and 16 and secured to panels 14 and 16 by screws. Side panels 14 and 16 are connected by a plurality of substantially parallel fastener bars 15 (cross-sectioned in FIG. 2) which are connected on the opposite ends thereof to panels 14 and 6. Bars 15 are preferably hollow tubes having internal threads on the opposite ends thereof. The bars 15 are preferably connected to panels 14 and 16 by means of a plurality of externally threaded inserts (not shown) which are screwed into panels 14 and 16 and the ends of bars 15. The fastener bars 15 support, and maintain a proper space between, panels 14 and 16.

Referring again to FIG. 1, the exercise treadmill 10 further comprises a right leg 22 and a left leg (not shown) similar to the right leg 22. Right leg 22 is removably secured within a right bushing 26 which is welded to right side panel 14. The left leg is removably secured within a left bushing 28 which is welded to left side panel 16. A handle 30 is removably secured within right bushing 26 and left bushing 28. The exercise treadmill 10 additionally includes a drive assembly 32, which includes a motor housing 34.

Referring to FIG. 2 and FIG. 3, the belt 12 of the present invention is illustrated in greater detail. For purposes of clarity, end covers 18 and 20 are not illustrated in FIG. 2 The unitary belt 12 comprises a continuous or endless loop of material, such as neoprene rubber or an elastomer material, having an outer surface 36 and an inner surface 38. During usage, the belt 12 is preferably positioned about a drive roller or pulley 40 on one end of the treadmill 10 and an idler pulley 42 on the opposite end of the treadmill 10. As illustrated in FIG. 3, a right shaft 44 is connected to and extends outward from one end of drive pulley 40 and a left shaft 46 is connected to and extends outward from the opposite end of drive pulley 40. Shafts 44 and 46 are received within bearings 48 and 50, respectively, which are press fitted within bearing pockets in side panels 14 and 16, respectively.

As illustrated in FIG. 2 and FIG. 4, a right shaft 45 is connected to and extends outward from one side of idler pulley 42 and a left shaft 47 is connected to and extends outward from the opposite side of idler pulley 42. Shafts 47 are received within bearings (not shown) which are press fitted within bearing pockets in side panels 14 and 16, respectively. Referring again to FIG. 3, shaft 44 of drive roller 40 may extend beyond bearing 48 and be connected to a first drive pulley 52. Drive pulley 52 is in operative engagement with a second drive pulley 54 by means of a belt 56 which is positioned about pulleys 52 and 54. Pulleys 52 and 54 and belt 56 are positioned within treadmill housing 58. Drive pulley 54 is in operative engagement with a motor within housing 34. Upon activation of the motor within housing 34, pulley 54 will rotate, thereby rotating pulley 52. Rotation of pulley 52 will impart rotational movement to drive roller 40, thereby causing belt 12 to travel about and between roller 40 and pulley 42 in the direction illustrated by the arrows in FIG. 2. Belt 12 will cause idler pulley 42 to rotate as belt 12 travels about pulley 42.

Referring to FIG. 2, FIG. 3, and FIG. 4, the uni-flex belt 12 of the present invention will be described in greater detail. FIG. 4 is a side view of a portion of treadmill 10 with side panel 14 and end plate 20 removed. The belt 12 comprises an outer portion 70 and an inner portion 72, each of which extends across the entire width W of belt 12. The outer portion 70 has a plurality of slits 74 therein which extend across the width W of the belt 12 and define a plurality of abutting rigid tread segments 76. Slits 74 extend radially inward from outer surface 36 approximately three fourths (¾) of the distance between outer surface 36 and inner surface 38 and slits 74 are substantially transverse to outer surface 36 and the direction of travel of belt 12. A plurality of belt relief holes 78 are located at the bottom of slits 74 and likewise extend across the width W of the belt 12. The width W of belt 12 is substantially uniform throughout the entire loop of belt 12. A plurality of substantially inextensible cords 80 are located within inner portion 72 of belt 12 substantially adjacent to inner surface 38. The cords 80 occupy the entire width W of belt 12. Cords 80 extend continuously around the entire loop of belt 12. Finally, cords 80 are preferably high strength, substantially nonstretchable cords, such as cords manufactured under the trademark "KEVLAR", or steel cords. Accordingly, belt 12 is constructed to bend in one direction only.

Referring to FIG. 2, FIG. 3, and FIG. 4, the belt 12 is preferably supported intermediate drive pulley 40 and idler pulley 42 by a plurality of support rollers 60. Stubs 62 and 64 are connected to rollers 60 and extend outward from the outer ends thereof. Stubs 62 and 64 are supported within the grooves of Teflon roller support bearings or mounting bars 66 and 68, respectively. Support bearings 66 and 68 are screwed to side panels 14 and 16, respectively. As shown in FIG. 4, belt 12 flexes as it moves around roller 42. Between rollers 42 and 46, the compression on each tread segment 76 prevents the belt 12 from sagging between the rollers. As mentioned above, this feature allows the belt to run quietly and with low friction.

It is to be understood that belt 12 is preferably molded in a circle with wedges forming slits 74 and holes 78. The belt 12 is preferably molded into a unitary, endless belt with the wedges forming a part of the mold. Cords 80 are preferably molded as part of the belt 12.

After the molding process, the sides of adjacent tread segments 76 should become substantially parallel. Alternatively, belt 12 may be molded in a circle with slits 74 and holes 78 thereafter cut in the belt 12. The inner portion 72 of the belt should preferably be as thin as possible since the friction created by usage of belt 12 will increase as the thickness of inner portion 72 increase. By way of example, in a constructed embodiment approximately two hundred fifty (250) cords 80 were used across the width W of belt 12 (approximately one hundred twenty-five (125) cords 80 per foot) with each of the cords 80 having a length substantially equivalent to the circumference of belt 12. Cords 80 may also be in the form of a weave or woven sheet.

Referring to FIG. 2 and FIG. 4, the operation of the belt 12 will be described in greater detail. The inner portion 72 of belt 12 is tensioned about drive roller 40 and idler pulley 42. As belt 12 travels about drive roller 40 and idler pulley 42 through zones A and A', respectively, belt 12 will flex and the segments 76 within zones A and A' will separate slightly. Holes 78 prevent the belt 12 from splitting as belt 12 flexes and travels about roller 40 and pulley 42. However, when the belt 12 passes through zones B and B', segments 76 will press together, as illustrated by the arrows in FIG. 4, preventing the belt from bending or sagging and forming a substantially smooth outer surface 36. The substantially smooth outer surface 36 is formed by the abutment of segments 76 and substantial alignment of the outer edges of segments 76 within zones B and B'. Thus, the inner portion 72 of belt 12 remains tensioned about roller 40 and pulley 42 while the outer portion 70 is alternately compressed and released. Further, the compression of segments 76 within zone B will increase as weight is applied to outer surface 36, such as will occur when a person walks or runs on belt 12 within zone B, providing a solid floor feeling to such a person.

In summary, the belt 12 of the present invention is designed to flex or bend only in the outward direction. The cords 80 and compaction of tread segments 76 substantially prohibit belt 12 from flexing or bending in the inward direction. That is, the combination of the compression or compaction of the tread segments 76 and the tension in cords 80 prohibit the belt 12 from sagging between the rollers 60 as the belt 12 passes through zone B. Further, the reduction in friction achieved by usage of the belt 12 allows usage of a motor having a low horsepower (hp), in the range of approximately ⅛ hp–¼ hp, when the belt 12 is incorporated into an active (motorized) system. Finally, the reduction in friction achieved by usage of the belt 12 readily facilitates usage of the belt 12 in a passive (e.g., foot powered) system.

It is to be understood that zones A and A' define arc segment areas of approximately one hundred and eighty degrees (180°) which extend across the entire width W of belt 12. Zones B and B' define areas above and below rollers 60, respectively, between zones A and A' which also extend across the entire width W of belt 12. It is also to be understood that the inner portion 72 of belt 12 is defined as the portion of belt 12 between the bottom of holes 78 (relative to outer surface 36) and inner surface 38 and that the outer portion 70 of belt 12 is defined as the remainder of belt 12, other than inner portion 72. Further, belt 12 may be molded so that the end of each of the tread segments 76 adjacent outer surface 36 is slightly thicker than the end of each such tread segments 76 adjacent inner portion 72. In such a design, tread segments 76 will press together within zones B and B' prior to being perpendicular to inner surface 38.

Figure 5:
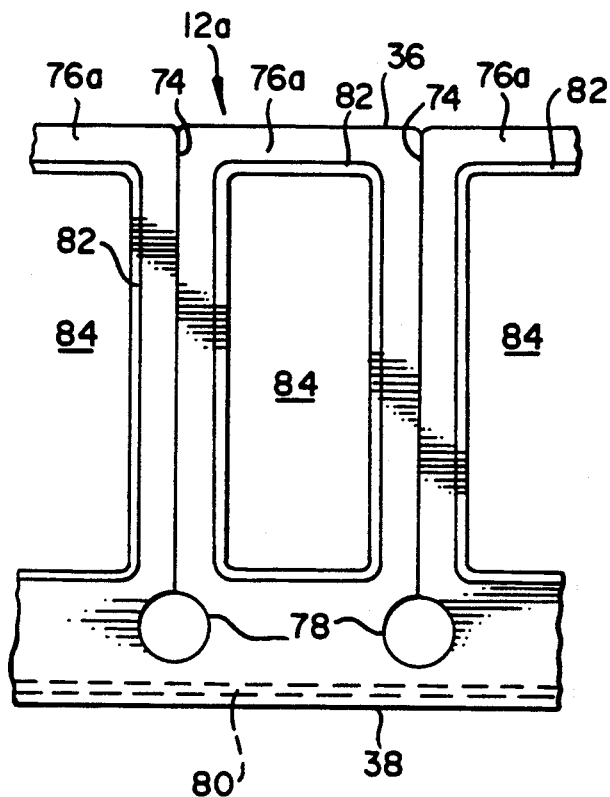
FIG. 5 is a partial side view of an alternate embodiment of the treadmill belt of the present invention.

Referring to FIG. 5, an alternate embodiment of the treadmill belt of the present invention is identified by the number 12a, with like numbers utilized to identify features discussed in connection with belt 12. Belt 12a is identical to belt 12 except that a plurality of reinforcing ribs or steel tubes 82 having passages 84 therethrough are positioned within belt 12a so as to provide a plurality of hollow tread segments 76a. Each of the hollow ribs 82 is positioned within one of the tread segments 76a and extends substantially across the width W of belt 12a. Belt 12a is preferably molded in the same manner as belt 12 except that tubes 82 are molded as part of belt 12a, with the opposite ends of tubes 82 being supported during the molding process. Further, belt 12a will operate in the same manner as belt 12.

It is to be understood that ribs 82 provide rigidity to tread segments 76a. Further, the use of such reinforcing ribs 82 will eliminate the necessity of extending rollers 60 across substantially the entire width W of belt 12a. That is, alternate rollers (not shown) may be secured to side panels 14 and 16 and be positioned beneath the outer edges of belt 12a.

It is to be understood that the drive assembly 32 is preferably a conventional treadmill drive assembly. Further, the drive assembly 32 may be provided with a conventional speed control mechanism (not shown), such as a governor assembly mounted within housing 34, to facilitate usage of the treadmill 10 as a passive system. The drive assembly 32 may also be provided with a quick disconnect to allow usage of the treadmill 10 as a passive system. It is also to be understood that belt 56 is preferably a nonslip, low friction timing belt. Alternatively, pulleys 52 and 54 may be replaced by gears and belt 56 may be replaced by a chain in operative engagement with such gears. Further, it is to be understood that idler pulley 42 is preferably provided with a conventional slide adjustment on each side thereof to assure that belt 12 tracks straight. Finally, it is to be understood that about shaft 44 so that treadmill 10 may lie flat, with the right and left legs removed from bushings 26 and 28, respectively. Alternatively, treadmill 10 may be mounted within a floor.

It is to be understood that belt 12 or 12a preferably has a width W of approximately two feet (2'). The distance between adjacent slits 74 or the thickness of each of the tread segments 76 or 76a is approximately in the range of one eighth inch ($\frac{1}{8}$") to one quarter inch ($\frac{1}{4}$"). Tube 82 preferably has a thickness or outer diameter in the range of approximately one eighth inch ($\frac{1}{8}$") to three sixteenths inch (3/16") and a height of approximately one half inch ($\frac{1}{2}$"). Belt 12 or 12a preferably has a thickness measured from outer surface 36 to inner surface 38 in the range of approximately three quarter inch ($\frac{3}{4}$") approximately one inch (1"). The loop of belt 12 or 12a preferably comprises a circumference of approximately eleven feet (11'), thereby providing a walking or running surface of approximately five feet (5') in length.

Figure 6:
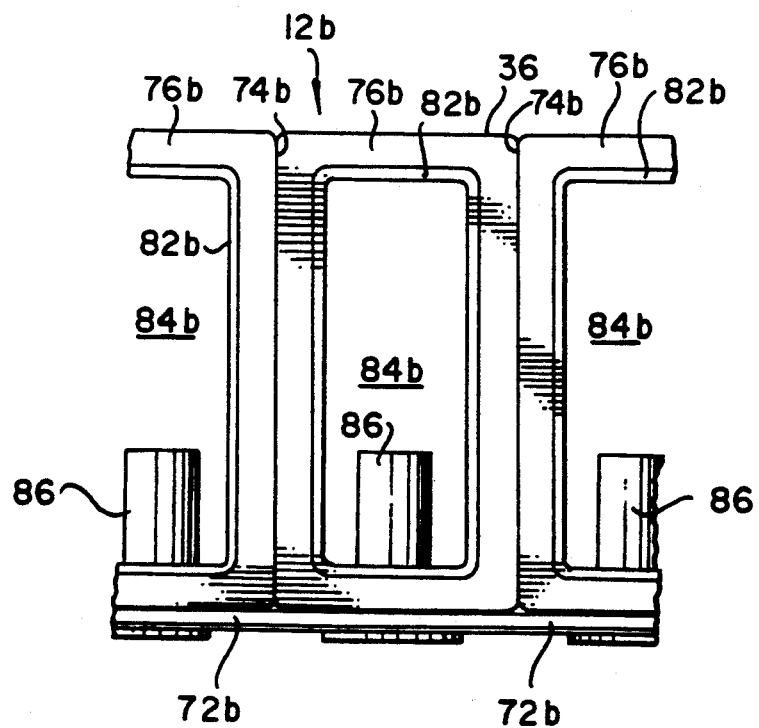
FIG. 6 is a partial side view of yet another embodiment of the treadmill belt of the invention.

In the embodiment shown in FIG. 6 is generally similar to the embodiment of FIG. 5, except that the inner portion designated 72b is a separate member, and is attached to the tread segments designated 76b by a number of screws or equivalent fasteners 86. Inner portion 72b preferably incorporates substantially inextensible cords, like the cords; 80 of the previous embodiment. The slits between the tread segments 76b are designated 74b. As in the embodiment of FIG. 5, a plurality of reinforcing ribs, in the form of steel tubes 82b are provided in the tread segments 76b, each having a passage 84b extending therethrough. As in the previous embodiment, each of the hollow ribs 82b is positioned within one of the tread segments 76b and extends substantially across the width W of the belt which is designated 12b. The passages through tubes 82b are designated 84b. Belt 12b may be molded in the same manner as belt 12a, as described above, and operates same manner as belt 12a. As in the previous embodiment, the ribs 82b provide rigidity to the tread segments 76b.

Figure 7:
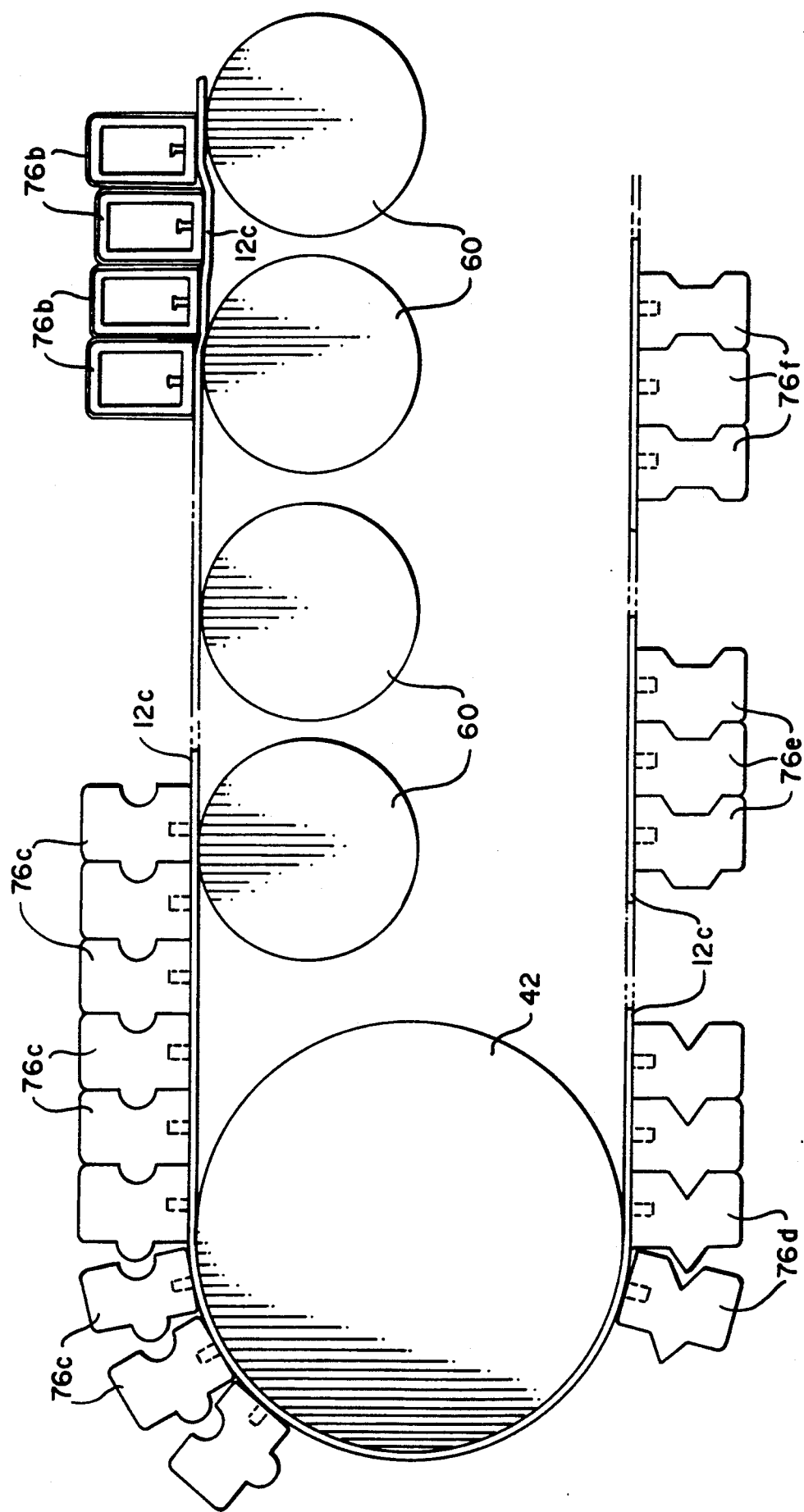
FIG. 7 is a composite schematic representation of further embodiments of the invention.

In the composite schematic representation of FIG. 7 a belt 12c is shown as extending around idler pulley 42 and over roller 60, in the same manner as the embodiment of FIG. 4.

In the composite schematic, tread segments 76b of the type described in conjunction with FIG. 6 are shown supported on belt 12c as described in conjunction with FIG. 6. However, and as shown in FIG. 7, when the downward force applied, for example, by a jogger's foot between the support rollers 60 exceeds the force of friction applied by the adjacent rubber coated treads 76b, as unwanted relative vertical movement of the treads occur, as shown FIG. 7.

This unwanted motion is prevented, for example, by providing treads, such as treads 76c which are constructed to incorporate appropriate tongue and groove couplings, as shown.

The tongue and groove couplings may assume a variety of shapes, such as shown, for example, by the tread segments 76d, 76e and 76f in FIG. 7.

It will be appreciated that while particular embodiments of the invention have been shown and described, modifications may be made. It is intended in the claims to cover all such modifications within the spirit and scope of the invention.

I claim:

1. An exercise treadmill belt constructed to flex or bend in one direction only, comprising a continuous loop having a segmented outer portion and a substantially inextensible inner portion attached to one another, said outer portion comprising a plurality of abutting rigid rectangular shaped tread segments extending parallel to one another across the full width of the belt, said tread segments being adapted to press together when in a flat plane and to be laterally compacted so as to provide a substantially smooth flat outer surface at the outer ends thereof and to cooperate with said substantially inextensible inner portion to prevent the belt from sagging or bending in the other direction.

2. The belt recited in claim 1, and further comprising a plurality of substantially inextensible cords within said inner portion of said belt and extending around the entire loop of said belt.

3. The belt recited in claim 1, and further comprising a plurality of reinforcing ribs, said ribs being positioned within respective ones of said tread segments and extending substantially across the width o the belt.

4. An exercise treadmill belt constructed to flex or bend in one direction only having forward and rearward belt support means, said belt comprising a continuous loop having a segmented outer portion and a substantially inextensible inner portion attached to one another, said outer portion comprising a plurality of rectangular-shaped abutting transverse rigid tread segments extending parallel to one another across the full width of the belt, said tread segments being adapted to separate as the belt travels about said forward and rearward belt support means and to press together and to be laterally compacted as the belt travels between said forward and rearward support means so as to provide a substantially smooth flat outer surface at the outer end of said tread segments, and to cooperate with said substantially inexpensive inner portion to prevent the belt from sagging or bending in the other direction.

5. The belt recited in claim 4, and further comprising a plurality of substantially inextensible cords positioned within said inner portion of said belt and extending around the entire loop of said belt.

6. The belt recited in claim 4, and further comprising a plurality of reinforcing ribs, said ribs being positioned within respective ones of said tread segments and extending substantially across the width of said belt.

7. An exercise treadmill belt constructed to flex or bend in one direction only having forward and rearward belt support means, comprising a continuous loop having a segmented outer portion and a substantially inextensible inner portion attached to one another, said outer portion comprising a plurality of abutting transverse rigid tread segments extending across the belt, said tread segments being adapted to separate as said belt travels about said forward and rear belt support means and to press together and to be laterally compacted as said belt travels between said forward and rearward support means o as to provide a substantially smooth outer surface, and to cooperate with said inner portion to prevent the belt from sagging or bending in the other direction, a plurality of hollow tubular reinforcing ribs positioned within respective ones of said tread segments and extending substantially across the width of said belt, and in which said inner portion is separate from said outer portion, and which comprises a plurality of fasteners extending through said inner portion and into the interior of said tubular ribs for attaching said inner portion to said outer portion.

8. The belt recited in claim 1, in which said transverse rigid tread segments are shaped to provide mating protuberances and depressions on the adjacent sides thereof extending horizontally across said sides to cause said segments to be coupled to one another when in their compacted state by resulting tongue and groove couplings so as to prevent relative vertical movement therebetween.

9. The belt recited in claim 7, further comprising a plurality of substantially inextensible cords positioned within said inner portion of said belt and extending around the entire loop of said belt.

* * * * *